(12) United States Patent
Ma

(10) Patent No.: US 10,193,386 B2
(45) Date of Patent: Jan. 29, 2019

(54) WIRELESS CHARGING METHOD AND SYSTEM, WIRELESS CHARGING DEVICE AND WEARABLE DEVICE

(71) Applicant: Huawei Technologies Co., Ltd., Shenzhen (CN)

(72) Inventor: Fuwei Ma, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 446 days.

(21) Appl. No.: 15/062,505

(22) Filed: Mar. 7, 2016

(65) Prior Publication Data

US 2016/0190862 A1    Jun. 30, 2016

Related U.S. Application Data

(63) Continuation of application No. PCT/CN2014/076055, filed on Apr. 23, 2014.

(30) Foreign Application Priority Data

Sep. 5, 2013  (CN) .......................... 2013 1 0400332

(51) Int. Cl.
*H02J 7/00* (2006.01)
*H02J 50/10* (2016.01)
(Continued)

(52) U.S. Cl.
CPC .............. *H02J 50/10* (2016.02); *H02J 5/005* (2013.01); *H02J 7/025* (2013.01); *H02J 50/80* (2016.02)

(58) Field of Classification Search
USPC ....................................................... 320/108
See application file for complete search history.

(56) References Cited

U.S. PATENT DOCUMENTS 6,754,472 B1   6/2004   Williams et al.
7,577,459 B2   8/2009   Tuomela et al.
(Continued)

FOREIGN PATENT DOCUMENTS

CN    102315697 A    1/2012
CN    103097175 A    5/2013
(Continued)

OTHER PUBLICATIONS

Partial English Translation and Abstract of Chinese Patent Application No. CN103135440, Mar. 15, 2016, 3 pages.
(Continued)

*Primary Examiner* — Robert Grant
(74) *Attorney, Agent, or Firm* — Conley Rose, P.C.

(57) ABSTRACT

A wireless charging method and system, a wireless charging device, and a wearable device. The method includes receiving, by a charging device, electric power usage data sent by at least one wearable device, determining, by the charging device, an electric power distribution solution according to the electric power usage data, where the electric power distribution solution is used to determine a charging order and charging electric power for charging the wearable device by the charging device, and performing, by the charging device, wireless charging on the wearable device according to the electric power distribution solution where the wireless charging method disclosure may coordinate a relationship between an actual electric power requirement of a user and charging capability distribution, thereby implementing overall arrangement of electric power among multiple wearable devices and dynamic distribution of charging capabilities.

17 Claims, 11 Drawing Sheets

---

S1. A charging device receives electric power usage data sent by at least two wearable devices

↓

S2. The charging device determines an electric power distribution solution according to the electric power usage data, where the electric power distribution solution is used to determine a charging order and charging electric power for charging the wearable device by the charging device

↓

S4. The charging device sends the electric power distribution solution to the wearable device

↓

S3. The charging device performs wireless charging on one or more of the at least two wearable devices according to the electric power distribution solution

(51) Int. Cl.
*H02J 5/00* (2016.01)
*H02J 7/02* (2016.01)
*H02J 50/80* (2016.01)

(56) References Cited

U.S. PATENT DOCUMENTS

2012/0007549 A1   1/2012   Murayama et al.
2013/0197710 A1   8/2013   Hansen
2015/0048789 A1*  2/2015   Kim .................... H02J 7/025
                                              320/108

FOREIGN PATENT DOCUMENTS

CN      103135440 A    6/2013
WO      2010080736 A1  7/2010

OTHER PUBLICATIONS

Foreign Communication From a Counterpart Application, PCT Application No. PCT/CN2014/076055, English Translation of International Search Report dated Jul. 25, 2014, 2 pages.
Foreign Communication From a Counterpart Application, PCT Application No. PCT/CN2014/076055, English Translation of Written Opinion dated Jul. 25, 2014, 13 pages.
Foreign Communication From a Counterpart Application, Chinese Application No. 201310400332.4, Chinese Office Action dated Feb. 1, 2016, 14 pages.

* cited by examiner

WIRELESS CHARGING METHOD AND SYSTEM, WIRELESS CHARGING DEVICE AND WEARABLE DEVICE

CROSS-REFERENCE TO RELATED APPLICATIONS

This application is a continuation of International Application No. PCT/CN2014/076055, filed on Apr. 23, 2014, which claims priority to Chinese Patent Application No. 201310400332.4, filed on Sep. 5, 2013, both of which are hereby incorporated by reference in their entireties.

TECHNICAL FIELD

The present disclosure relates to the wireless communications field, and in particular, to a wireless charging method and system, a wireless charging device, and a wearable device.

BACKGROUND

At present, a wearable device is rapidly developing due to advantages such as portability; however, a size and a weight of the wearable device limit a battery capacity of the wearable device, which leads to a problem of short standby time and affects user experience. For example, a pair of GOOGLE GLASS equipped with a 570 milliampere hour (mAh) battery can be used for only three to four hours. In addition, wireless charging is drawing greater attention due to convenience of charging.

An existing wireless charging technology is only a simple substitution of a wired charging manner. When an existing wireless charging device is working, a charging process and a user service are independent of each other. However, in a process of actual use, electric power consumption of a device is closely related to a use degree of an application service. For example, a smartphone can be used for more than two days if used only for conversation, but can be used for only one day if used as a wireless terminal to run various applications such as audio/video downloading and playing, web page browsing, and photographing.

The existing wireless charging technology cannot meet differentiated electric power requirements.

SUMMARY

Technical Problem

In view of this, a technical problem to be resolved in the present application is how to coordinate a relationship between an actual electric power requirement of a user and charging capability distribution in order to implement overall arrangement of electric power among multiple wearable devices and dynamic distribution of charging capabilities, and meet differentiated electric power requirements of the user.

Solution

To resolve the foregoing technical problem, according to an embodiment of the present disclosure, a first aspect provides a wireless charging method, including receiving, by a charging device, electric power usage data sent by at least one wearable device, determining, by the charging device, an electric power distribution solution according to the electric power usage data, where the electric power distribution solution is used to determine a charging order and a charging electric power for charging the at least one wearable device by the charging device, and performing, by the charging device, wireless charging on the wearable device according to the electric power distribution solution.

With reference to the first aspect, in a first possible implementation manner, the electric power distribution solution is further used to determine at least one of a charging speed, a charging time, and magnetic field strength.

With reference to the first aspect and the first possible implementation manner of the first aspect, in a second possible implementation manner, the electric power usage data includes current electric power and an electric power consumption speed.

With reference to the foregoing two possible implementation manners of the first aspect, in a third possible implementation manner, the determining, by the charging device, an electric power distribution solution according to the electric power usage data further includes obtaining, by the charging device, an electric power requirement parameter according to the electric power usage data, determining, by the charging device according to the electric power requirement parameter, the charging order for charging the wearable device, and determining, by the charging device according to the electric power usage data, the charging electric power for charging the wearable device.

With reference to the foregoing three possible implementation manners of the first aspect, in a fourth possible implementation manner, the electric power requirement parameter includes an expected electric power support time, and expected electric power support time=current electric power/electric power consumption speed.

With reference to the foregoing four possible implementation manners of the first aspect, in a fifth possible implementation manner, the electric power usage data further includes a charging precedence coefficient.

With reference to the foregoing five possible implementation manners of the first aspect, in a sixth possible implementation manner, the step of determining, by the charging device according to the electric power requirement parameter, the charging order for charging the wearable device further includes, if the wearable device includes at least one wearable device in use or at least one wearable device in a standby state, and if the electric power requirement parameter of the wearable device is not greater than a preset threshold, determining the electric power distribution solution for the wearable device according to the electric power usage data of the wearable device.

With reference to the foregoing six possible implementation manners of the first aspect, in a seventh possible implementation manner, the step of determining, by the charging device according to the electric power requirement parameter, the charging order for charging the wearable device further includes, if the wearable device includes a wearable device in use and a wearable device in a standby state, when a first electric power requirement parameter obtained according to electric power usage data of the wearable device in use is not greater than a first threshold, determining, by the charging device, a first electric power distribution solution, and when the first electric power requirement parameter is greater than the first threshold, and a second electric power requirement parameter obtained according to electric power usage data of the wearable device in the standby state is not greater than a second threshold, determining, by the charging device, a second electric power distribution solution.

With reference to the foregoing seven possible implementation manners of the first aspect, in an eighth possible implementation manner, the step of determining, by the charging device, an electric power distribution solution according to the electric power usage data further includes performing, by the charging device, the following steps based on a water-filling algorithm: extracting current electric power of two wearable devices with minimum electric power requirement parameters, and determining an adjustment value for electric power distribution based on a difference between the current electric power of the two wearable devices; determining, according to the adjustment value, a step value of electric power provided for the charging; and using the step value as the electric power distribution solution, to determine charging electric power for charging a wearable device with a minimum electric power requirement parameter.

With reference to the foregoing eight possible implementation manners of the first aspect, in a ninth possible implementation manner, after the determining, by the charging device, an electric power distribution solution according to the electric power usage data, the method further includes sending, by the charging device, the electric power distribution solution to the wearable device, where a manner of the sending, by the charging device, the electric power distribution solution to the wearable device includes human body communication (HBC), wireless fidelity (WIFI), or BLUETOOTH.

With reference to the foregoing nine possible implementation manners of the first aspect, in a tenth possible implementation manner, the charging, by the charging device, the wearable device further includes controlling, by the charging device according to the electric power distribution solution, another wireless charging device to charge the wearable device.

To resolve the foregoing technical problem, according to a second aspect, another embodiment of the present disclosure provides a wireless charging request method, including acquiring, by a wearable device, electric power usage data, sending, by the wearable device, the electric power usage data to a charging device, receiving, by the wearable device, an electric power distribution solution sent by the charging device, where the electric power distribution solution is determined by the charging device based on the electric power usage data, and is used to determine a charging order and charging electric power for charging the wearable device by the charging device, and controlling, by the wearable device according to the electric power distribution solution, receiving of electric power sent by the charging device.

With reference to the second aspect, in a first possible implementation manner, the electric power distribution solution further includes at least one of a charging speed, a charging time, and magnetic field strength.

With reference to the second aspect, in a second possible implementation manner, the electric power usage data includes current electric power and an electric power consumption speed.

With reference to the second aspect and the first or the second possible implementation manner of the second aspect, in a third possible implementation manner, the electric power usage data further includes a charging precedence coefficient.

With reference to the foregoing three possible implementation manners of the second aspect, in a fourth possible implementation manner, a manner of the sending, by the wearable device, the electric power usage data to a charging device includes HBC, WIFI, or BLUETOOTH.

With reference to the foregoing four possible implementation manners of the second aspect, in a fifth possible implementation manner, the controlling, according to the electric power distribution solution, receiving of electric power sent by the charging device further includes controlling, by the wearable device, output load and a quantity of turns of a wireless charging coil in order to receive electric power, and controlling, by the wearable device, output of the received electric power to a service in use and a battery, or an output time.

To resolve the foregoing technical problem, according to a third aspect, still another embodiment of the present disclosure provides a wireless charging device, including a first receiving module configured to receive electric power usage data sent by at least one wearable device, a solution determining module, connected to the first receiving module and configured to determine an electric power distribution solution according to the electric power usage data, where the electric power distribution solution is used to determine a charging order and charging electric power for charging the wearable device by the charging device, and an electric power distribution module, connected to the solution determining module and configured to charge the wearable device according to the electric power distribution solution.

With reference to the third aspect, in a first possible implementation manner, the electric power distribution solution determined by the solution determining module is further used to determine at least one of a charging speed, a charging time, and magnetic field strength.

With reference to the third aspect, in a second possible implementation manner, the electric power usage data received by the first receiving module includes current electric power and an electric power consumption speed.

With reference to the third aspect and the first or the second possible implementation manner of the third aspect, in a third possible implementation manner, the solution determining module further includes a calculating unit configured to obtain an electric power requirement parameter according to the electric power usage data received by the first receiving module, and a determining unit, connected to the calculating unit and configured to determine, according to the electric power requirement parameter, the charging order for charging the wearable device, and configured to determine, according to the electric power usage data, the charging electric power for charging the wearable device.

With reference to the foregoing three possible implementation manners of the third aspect, in a fourth possible implementation manner, the electric power requirement parameter obtained by the calculating unit includes an expected electric power support time, and the calculating unit is further configured to obtain the electric power requirement parameter according to the following formula: expected electric power support time=current electric power/electric power consumption speed.

With reference to the foregoing four possible implementation manners of the third aspect, in a fifth possible implementation manner, the electric power usage data received by the first receiving module further includes a charging precedence coefficient.

With reference to the foregoing five possible implementation manners of the third aspect, in a sixth possible implementation manner, the solution determining module further includes a setting unit configured to preset and store a threshold, and if the wearable device includes at least one wearable device in use and at least one wearable device in a standby state, the determining unit is further configured to determine whether the electric power requirement parameter calculated by the calculating unit is not greater than the threshold, and if it is not greater than the threshold, determine the electric power distribution solution for the wearable device according to the electric power usage data of the wearable device.

With reference to the foregoing six possible implementation manners of the third aspect, in a seventh possible implementation manner, if the wearable device includes at least one wearable device in use and at least one wearable device in a standby state, the setting unit is further configured to preset and store a first threshold and a second threshold. The calculating unit is further configured to calculate a first electric power requirement parameter based on electric power usage data of the wearable device in use and a second electric power requirement parameter based on electric power usage data of the wearable device in the standby state, and the determining unit is further configured to determine whether the first electric power requirement parameter is not greater than the first threshold, and if yes, determine a first electric power distribution solution, and determine whether the second electric power requirement parameter is not greater than the second threshold, and if yes, determine a second electric power distribution solution.

With reference to the foregoing seven possible implementation manners of the third aspect, in an eighth possible implementation manner, the determining unit is further configured to extract current electric power of two wearable devices with minimum electric power requirement parameters based on a water-filling algorithm, and determine an adjustment value for electric power distribution based on a difference between the current electric power of the two wearable devices, determine, according to the adjustment value, a step value of electric power provided for the charging, and use the step value as the electric power distribution solution, to determine charging electric power for charging a wearable device with a minimum electric power requirement parameter.

With reference to the foregoing eight possible implementation manners of the third aspect, in a ninth possible implementation manner, the wireless charging device further includes a first sending module configured to send the electric power distribution solution to the wearable device, where a manner in which the first sending module sends the electric power distribution solution to the wearable device includes HBC, WIFI, or BLUETOOTH.

With reference to the foregoing nine possible implementation manners of the third aspect, in a tenth possible implementation manner, the wireless charging device further includes a first control module configured to control, according to the electric power distribution solution, another wireless charging device to charge the wearable device.

To resolve the foregoing technical problem, according to a fourth aspect, yet another embodiment of the present disclosure provides a wearable device, including an acquiring module configured to acquire electric power usage data, a second sending module, connected to the acquiring module and configured to send the electric power usage data to a charging device, a second receiving module, connected to the second sending module and configured to receive an electric power distribution solution sent by the charging device, where the electric power distribution solution is determined by the charging device based on the electric power usage data, and is used to determine a charging order and charging electric power for charging the wearable device by the charging device, and a second control module, connected to the second receiving module and configured to control, according to the electric power distribution solution, receiving of electric power sent by the charging device.

With reference to the fourth aspect, in a first possible implementation manner, the electric power usage data acquired by the acquiring module further includes current electric power and an electric power consumption speed.

With reference to the fourth aspect, in a second possible implementation manner, the acquiring module is further configured to acquire a charging precedence coefficient selected by a user.

With reference to the fourth aspect and the first or the second possible implementation manner of the fourth aspect, in a third possible implementation manner, a manner in which the second sending module sends the electric power usage data to the charging device includes HBC, WIFI, or BLUETOOTH.

With reference to the foregoing three possible implementation manners of the fourth aspect, in a fourth possible implementation manner, the second control module is further configured to control output load and a quantity of turns of a wireless charging coil in order to receive electric power, and control output of the received electric power to a service in use and a battery, and an output time.

To resolve the foregoing technical problem, according to a fifth aspect, a next embodiment of the present disclosure provides a wireless charging system, including a charging device of any structure in the embodiments of the present disclosure and a wearable device of any structure in the embodiments of the present disclosure.

Beneficial Effects

According to the wireless charging method and system, the wireless charging device, and the wearable device in the embodiments of the present disclosure, a relationship between an actual electric power requirement of a user and charging capability distribution can be coordinated, thereby implementing overall arrangement of electric power among multiple wearable devices and dynamic distribution of charging capabilities.

A charging capability of a charging device is preferentially distributed to a wearable device that is being used and that has relatively high electric power consumption in order to supplement electric power consumption of the wearable device in a timely manner to support its normal use. A remaining charging capability may be provided to a wearable device that is temporarily in a standby state to supplement electric power reserve of the wearable device for usage at any time.

According to the wireless charging method and system, the wireless charging device, and the wearable device in the embodiments of the present disclosure, a dynamic process related to an actual running service status of a wearable device is described, where summarization of electric power usage data and distribution of electric power distribution solutions are performed in real time, and a change of an electric power status of any wearable device may change an electric power distribution solution. According to the wireless charging method and system, the wireless charging device, and the wearable device in the embodiments of the present disclosure, wireless charging electric power between wearable devices can be balanced in order to ensure that electric power supplementation of each wearable device matches electric power reserve and electric power consumption of the wearable device, and establish a linkage mechanism between wireless charging and a dynamic service feature of each wearable device.

Sending and receiving of data and a solution are implemented in a HBC manner, and even in a case of no wireless network, wireless charging can also be implemented.

Exemplary embodiments are described in detail with reference to accompanying drawings to make other features and aspects of the present disclosure clearer.

BRIEF DESCRIPTION OF DRAWINGS

Accompanying drawings included in the specification and constituting a part of the specification and the specification illustrate exemplary embodiments, features, and aspects of the present disclosure, and are used for explaining principles of the present application.

DESCRIPTION OF EMBODIMENTS

Figure 1:
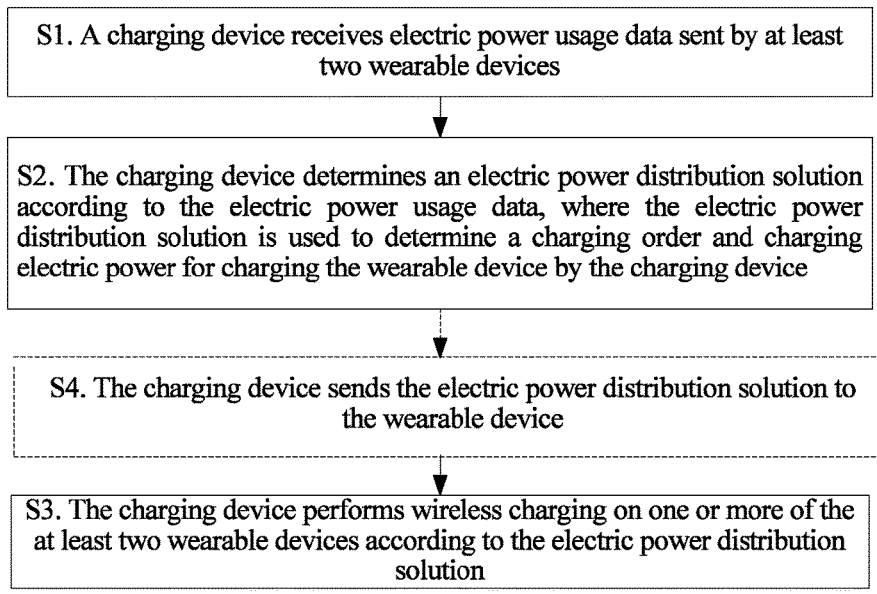
FIG. 1 shows a flowchart of a wireless charging method according to Embodiment 1 of the present disclosure.

The following describes various exemplary embodiments, features, and aspects of the present disclosure in detail with reference accompanying drawings. Same reference numerals in the accompanying drawings designate elements that have same or similar functions. Various aspects of the embodiments illustrated in the accompanying drawings may not be necessarily drawn to scale, unless otherwise specified.

The special term "exemplary" herein refers to "can be used as an example, an embodiment, or an illustration". Any embodiment described as "exemplary" herein is not necessarily to be interpreted as superior to or better than other embodiments.

In addition, to better describe the present disclosure, many details are given in the following specific implementation manners. A person skilled in the art shall understand that the present disclosure may still be implemented even without such details.

Embodiment 1

FIG. 1 shows a flowchart of a wireless charging method according to Embodiment 1 of the present disclosure. As shown in FIG. 1, the wireless charging method mainly includes the following steps.

Step S1: A charging device receives electric power usage data sent by at least two wearable devices.

One wearable device may acquires its own electric power usage data and sends the electric power usage data to the charging device. The charging device receives the electric power usage data of all the wearable devices.

Step S2: The charging device determines an electric power distribution solution according to the electric power usage data, where the electric power distribution solution is used to determine a charging order and charging electric power for charging the wearable devices by the charging device.

Step S3: The charging device performs wireless charging on one or more of the at least two wearable devices according to the electric power distribution solution.

According to the wireless charging method provided in this embodiment of the present disclosure, a charging device determines an electric power distribution solution according to electric power usage data, and charges a wearable device according to the electric power distribution solution in order to coordinate a relationship between an actual electric power requirement of a user and charging capability distribution, thereby implementing a process of overall arrangement of electric power and dynamic distribution of charging capabilities.

Embodiment 2

With reference to FIG. 1, a specific procedure of a wireless charging method according to Embodiment 2 of the present disclosure is illustrated. A difference between this embodiment and the foregoing embodiment lies in that, after step S2, the method further includes step S4: The charging device sends the electric power distribution solution to the wearable device. The method further includes the following steps.

Step S1: A charging device receives electric power usage data sent by a wearable device.

Electric power requirement data is data that is acquired by one wearable device and that reflects an electric power requirement situation of the wearable device, and may be one or more pieces of the following data, current electric power (c), an electric power consumption rate (c/s), a proportion of remaining electric power (%), full electric power standby time (s), an average electricity consumption rate (c/s), and the like.

The wearable device acquires its own electric power usage data. Using the current electric power as an example, the wearable device acquires its own current electric power and sends it to the charging device. The charging device receives the electric power usage data.

Step S2: The charging device determines an electric power distribution solution according to the electric power usage data, where the electric power distribution solution is used to determine a charging order and charging electric power for charging one or more of at least two wearable devices by the charging device.

The electric power distribution solution is used for overall arrangement of electric power and dynamic distribution of charging capabilities of the charging device. The electric power distribution solution may include one or more of the charging order, the charging electric power, a charging speed, magnetic field strength, a charging time, and the like.

The charging device determines the electric power distribution solution according to the electric power usage data and based on a water-filling algorithm. The water-filling algorithm is an application algorithm that uses a water-filling process for reference. Filling a pool with water is a process in which a water volume is gradually increasing and a water level is gradually rising. First there is water at the bottom of the pool, and the water level is gradually rising with increase of a volume of filled water.

In the application algorithm that uses the water-filling process for reference, to-be-allocated resources (energy, power, and the like) are water, each object requesting a resource is one place in a pool, a quantity of resources requested by each object is a height of a corresponding position, and a process of allocating a resource to each object is a process of gradually filling the pool with water.

Figure 2:
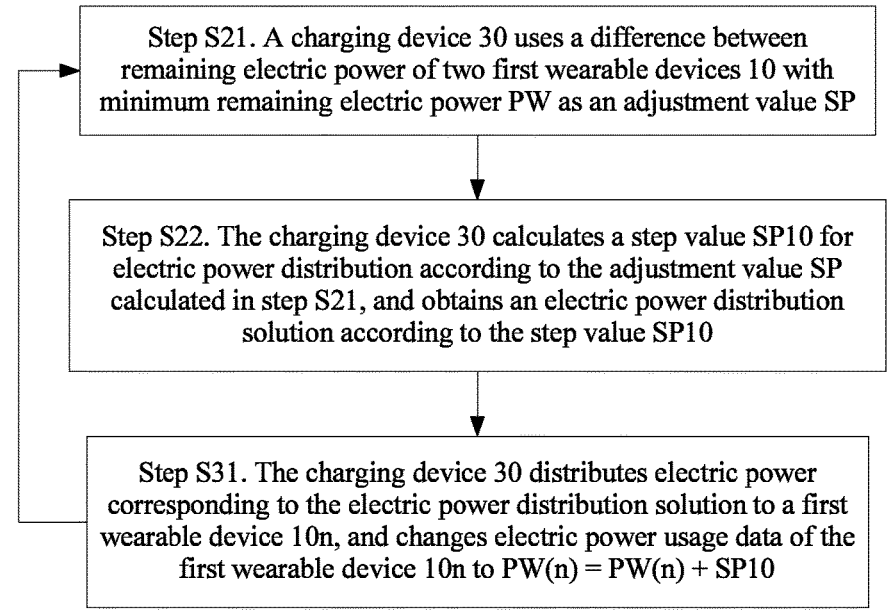
FIG. 2 shows a flowchart of a water-filling algorithm.

FIG. 2 shows a flowchart of a water-filling algorithm, which includes the following steps.

Step S21: A charging device 30 uses a difference between current electric power of two first wearable devices 10 with minimum current electric power (PW) as an adjustment value Step Power (SP).

The current PW herein is obtained through real-time detection by one first wearable device 10 in step S1. As charging on the first wearable device 10 performed by the charging device 30 proceeds, the current electric power of the first wearable device 10 changes.

Step S22: The charging device 30 calculates a step value SP10 for electric power distribution according to the adjustment value SP calculated in step S21, and obtains an electric power distribution solution according to the step value SP10.

According to the adjustment value SP calculated in step S21, one-tenth of the adjustment value SP, namely SP10, is used as a step value of increase in the electric power, and the step value SP10 is used as an electric power distribution solution for a first wearable device 10n with minimum current electric power. It can be understood by a person skilled in the art that the adjustment value and the step value of increase in the electric power may also be in another mathematic relation, and may be adjusted according to an actual situation.

In a possible implementation manner, after determining the charging electric power, an appropriate charging speed, for example, a charging speed that is greater than an electric power consumption speed, may be preset to charge the wearable device, and then a charging time and magnetic field strength can be both determined accordingly. Therefore, the electric power distribution solution can be formed by the charging speed, the charging time, the magnetic field strength, and the charging order and the charging electric power that are determined in the previous step.

Step S23: The charging device sends the electric power distribution solution to the wearable device. A sending manner includes: HBC, WIFI, or BLUETOOTH.

Step S24: The charging device charges the wearable device according to the electric power distribution solution.

Figure 3:
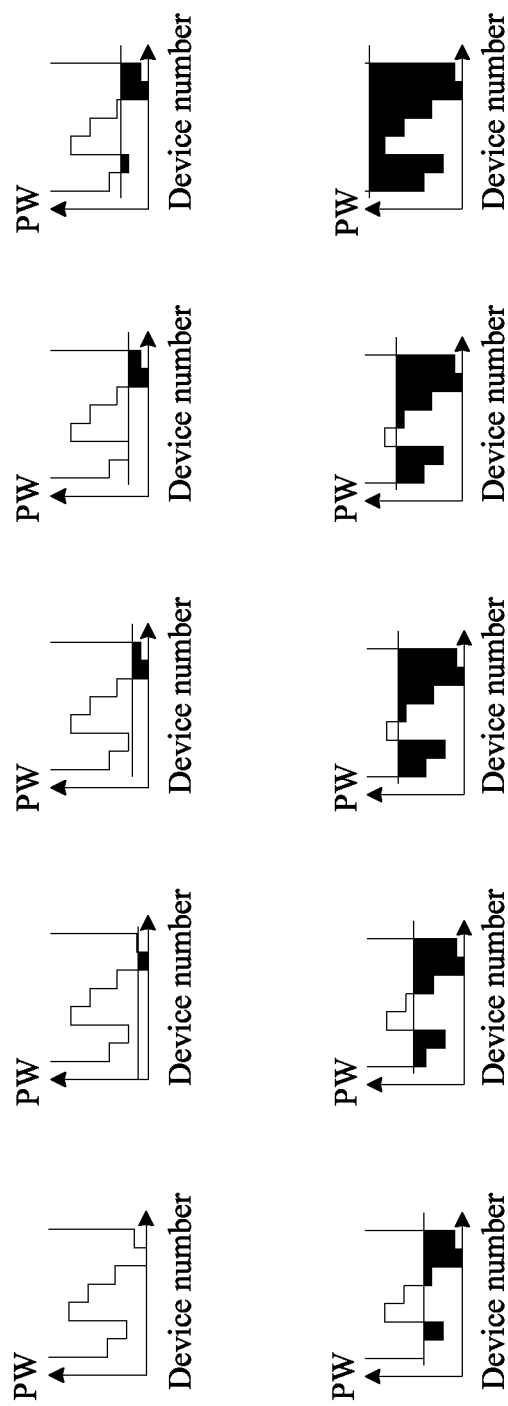
FIG. 3 shows a schematic diagram of a water-filling algorithm.

FIG. 3 shows a schematic diagram of current PW of each first wearable device 10, where a lateral axis indicates sequence numbers (which, for example, may include 1, 2, 3, 4, . . . , and N) of multiple first wearable devices 10, and a longitudinal axis indicates the current PW of each first wearable device 10.

Step S31: The charging device 30 distributes electric power corresponding to the electric power distribution solution to a first wearable device 10n, and changes electric power usage data of the first wearable device 10n to PW(n)=PW(n)+SP10. A curve at a corresponding position changes accordingly, and distributable electric power is further changed as P=P−SP10, as shown in FIG. 2.

Return to step S21, and reallocate the electric power distribution solution.

FIG. 3 shows a process of distributing electric power, where a black part indicates distributed electric power, a black column at a position corresponding to each first wearable device 10 indicates electric power distributed to the first wearable device 10. As seen from left to right, a gradually rising black dotted line describes a process of a water-filling algorithm in which a rising tide lifts all boats. In this process, each first wearable device 10 is also supplied with required electric power gradually.

Embodiment 3

Figure 4:
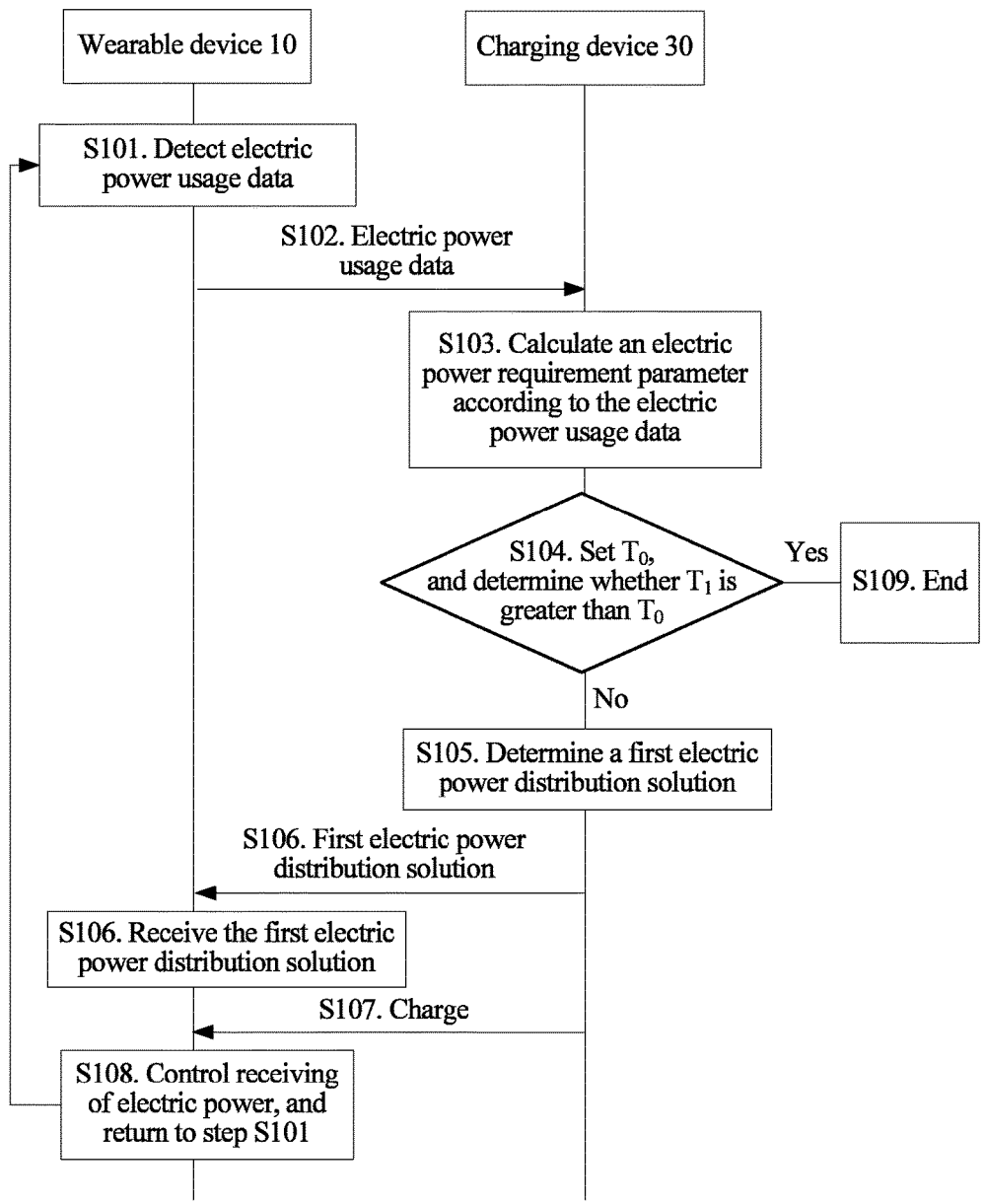
FIG. 4 shows a flowchart of a wireless charging method according to Embodiment 3 of the present disclosure.

FIG. 4 shows a flowchart of a wireless charging method according to Embodiment 3 of the present disclosure. As shown in FIG. 4, the wireless charging method mainly includes the following steps.

Step S101: A first wearable device 10 detects electric power usage data.

Electric power usage data of a wearable device is related to a current service type, an electricity consumption level, expected service duration, battery electric power reserve, and the like. The service type reflects an electricity consumption feature, for example, electric power consumption of a photoflash lamp is sudden electric power consumption, electric power consumption of video playing mainly lies in screen display brightness and duration of the video playing, electric power consumption of web page browsing mainly includes two parts: screen display and a wireless network.

Step S102: The first wearable device 10 sends the electric power usage data to a charging device 30.

A sending manner in which the first wearable device 10 sends its own electric power usage data acquired in step S101 to the charging device 30 may be HBC, WIFI, or BLUETOOTH. The charging device 30 receives the electric power usage data.

Step S103: The charging device 30 calculates an electric power requirement parameter according to the electric power usage data.

In this embodiment of the present disclosure, the electric power usage data is directly acquired by the first wearable device 10 and reflects an electric power usage situation. The electric power requirement parameter is obtained by means of further calculation by the charging device 30 according to the electric power usage data and the electric power requirement parameter reflects an electric power requirement situation.

When the electric power usage data includes current electric power and an electric power consumption speed, the electric power requirement parameter includes an expected electric power support time. In this embodiment of the present disclosure, the wearable device is distinguished as a wearable device in use and a wearable device in a standby state. The wearable device in use indicates a wearable device on which some services are being used by a user; the wearable device in a standby state indicates a wearable device in a power-on state on which no other program is used by a user.

A formula of calculating an expected electric power support time of a wearable device in use may be $$T1 = PW/v \qquad (1),$$

where T1 indicates a expected electric power support time of a wearable device in use, PW indicates current electric power of a wearable device in use, and v indicates an electric power consumption speed of a wearable device in use.

When the electric power usage data includes a proportion of remaining electric power and full electric power standby time, the electric power requirement parameter includes the expected electric power support time.

A formula of calculating an expected electric power support time of a wearable device in a standby state may be $$T2 = m \times t \qquad (2),$$

where T2 indicates a expected electric power support time of a wearable device in the standby state, m indicates a proportion of remaining electric power of a wearable device in the standby state, and t is full electric power standby time of a wearable device in the standby state, where the full electric power standby state may be full electric power usage time recorded in a device specification.

This embodiment uses an example of calculating an expected electric power support time T for description, and uses the wearable device in use as an example. There are one or more first wearable devices 10 in use, and the foregoing formula (1) is applicable to an expected electric power support time T1 of a first wearable device 10. A person skilled in the art should understand that the wireless charging method described in this embodiment is also applicable to a first wearable device 10 in a standby state.

Step S104: The charging device 30 sets a first threshold T0, and determines whether the electric power requirement parameter is greater than T0.

The charging device 30 presets the first threshold T0, and determines whether the expected electric power support time T1 of the first wearable device 10 is greater than the first threshold T0.

If T1>T0, step S109 is performed.
If T1<=T0, step S105 is performed.

Step S105: The charging device 30 determines a first electric power distribution solution according to the electric power requirement parameter.

According to the expected electric power support time T1 of the first wearable device 10 calculated in step S103, the charging device 30 determines the first electric power distribution solution for the first wearable device 10 in use using a water-filling algorithm.

In one embodiment, the charging device 30 preferentially charges a first wearable device 10 with a minimum expected electric power support time T1, extracts current electric power of two first wearable devices 10 with minimum expected electric power support times T1, and performs steps S21 to S22 in Embodiment 2 to determine the first electric power distribution solution.

Step S106: The charging device 30 sends the first electric power distribution solution to the first wearable device 10.

Referring to FIG. 4, preferably, the charging device 30 sends the first electric power distribution solution determined in step S105 to the first wearable device 10. The sending manner may be HBC, WIFI, or BLUETOOTH. The first wearable device 10 receives the first electric power distribution solution.

Step S107: The charging device 30 charges the first wearable device 10 according to the first electric power distribution solution.

Figure 5:
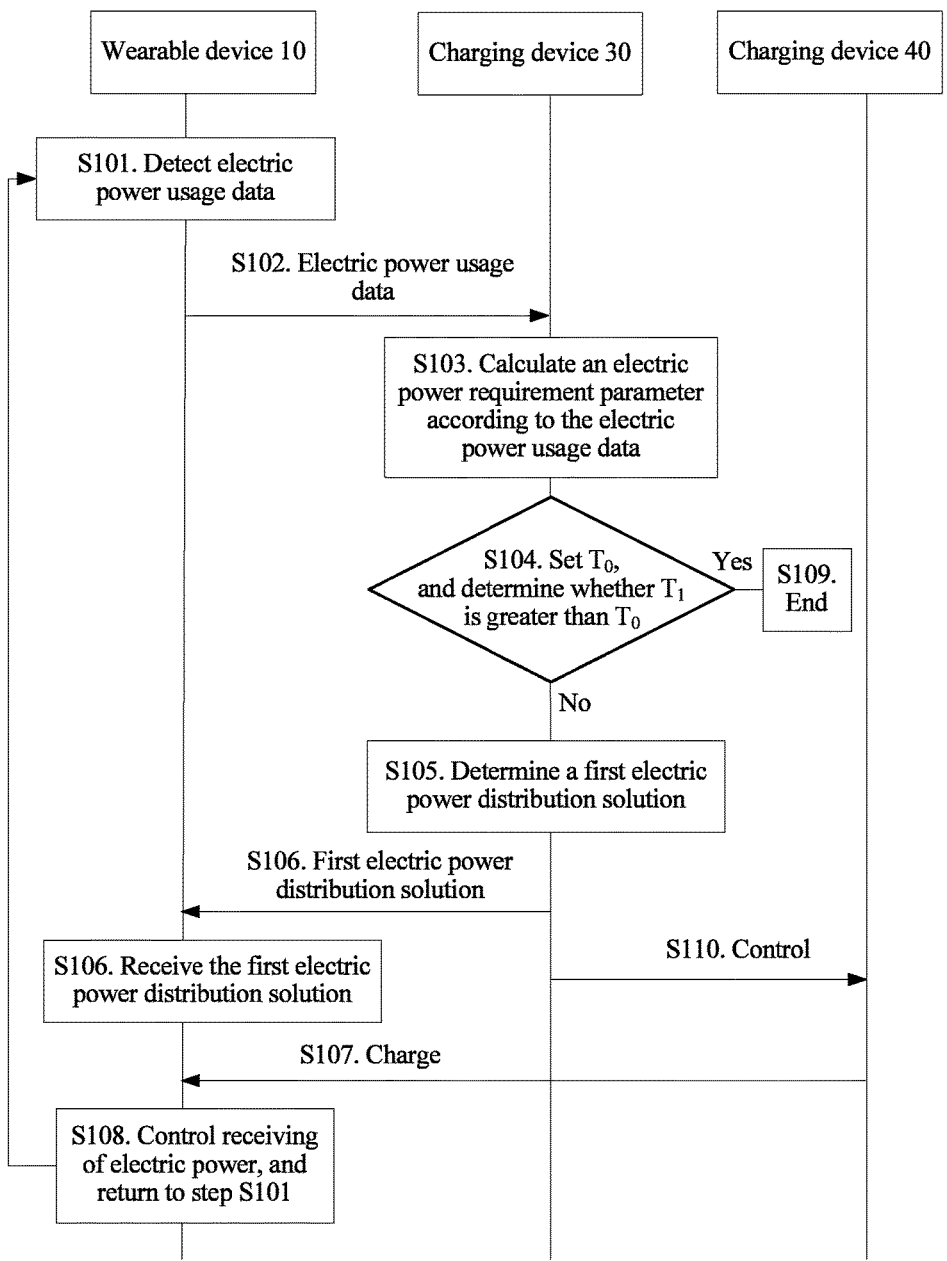
FIG. 5 shows another flowchart of a wireless charging method according to Embodiment 3 of the present disclosure.
Figure 6A:
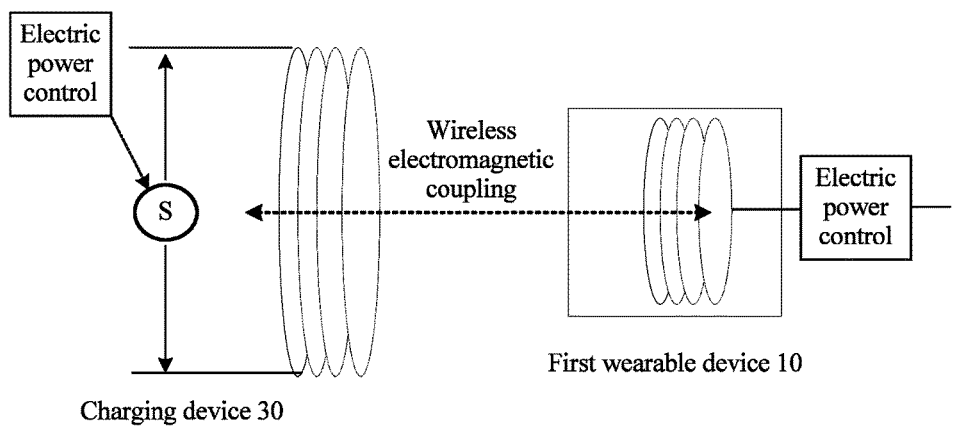
FIG. 6A, FIG. 6B, FIG. 6C and FIG. 6D show schematic diagrams of a process in which a wearable device controls a coil to receive electric power according to an embodiment of the present disclosure.
Figure 6B:
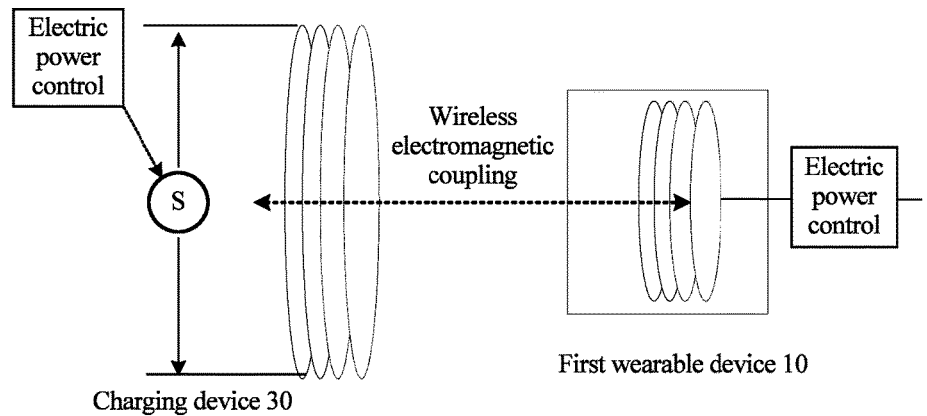
Figure 6C:
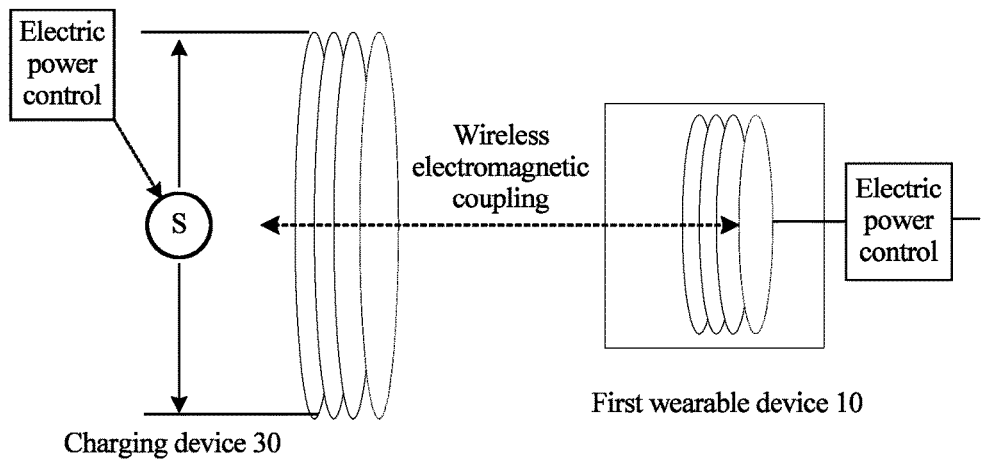
Figure 6D:
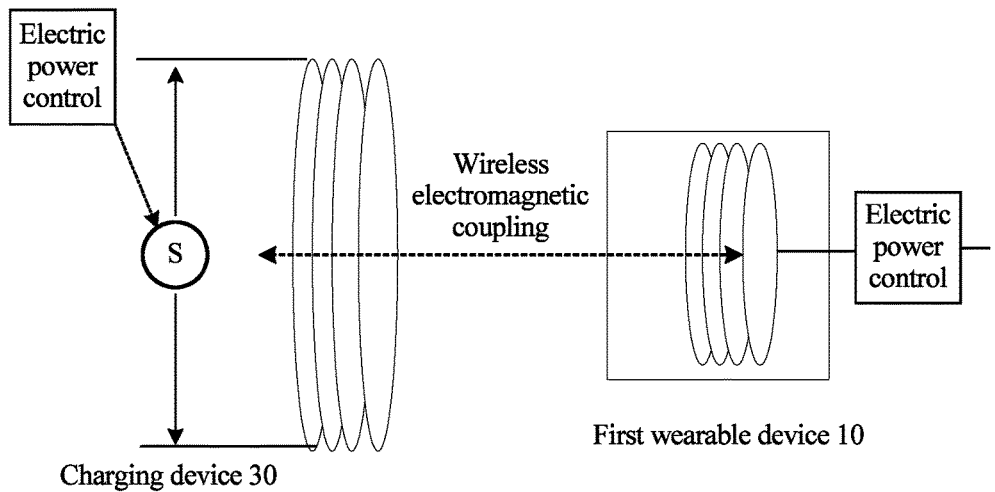

The charging device 30 charges the first wearable device 10 according to the first electric power distribution solution. In addition, as shown in FIG. 5, in a possible implementation manner, the charging device 30 may control another wireless charging device 40 to complete a charging process described in step S105. A connection is established between the charging device 30 and the another charging device 40 that has a wireless charging capability, where a connection manner may be any wireless connection manner such as WIFI or BLUETOOTH. The charging process further includes:

In one embodiment of the present disclosure, as show in FIG. 5, the charging process can be executed by two charging devices. In this embodiment, after Step S106, the charging process will execute the Step S110 and another charging device will charge the first wearable device 10.

Step S110: The charging device 30 controls a charging device 40 to charge the first wearable device 10.

That is, the step of determining the electric power distribution solution and the step of charging the wearable device in this embodiment are not limited to be completed by a same charging device, and may be respectively performed by two or more wireless charging devices. In this way, even if electric power of the charging device 30 is insufficient, electric power can also be provided to the wearable device by another charging device with sufficient electric power.

Step S108: The first wearable device 10 controls receiving of the electric power, and returns to step S101, as shown in FIG. 4.

The first wearable device 10 controls, according to the first electric power distribution solution, output load and a quantity of turns of a wireless charging coil in order to receive the electric power, and controls output of the received electric power to a power-consuming service and a battery, and/or an output time in order to properly distribute the electric power to a currently consuming service and a battery for reserve.

Returning to step S101, the first wearable device 10 acquires the electric power usage data in real time according to an electric power consumption speed of the first wearable device 10 and the received electric power, and feeds back the electric power usage data to the charging device 30 such that the charging device 30 calculates the electric power requirement parameter according to the new electric power usage data, and determines a new first electric power distribution solution based on the water-filling algorithm in order to adapt to actual service power consumption of the first wearable device 10. An adjustment of the electric power distribution solution generally lags behind an electric power consumption requirement of the wearable device, and a lagging part is compensated by reserved electric power of a battery of the wearable device.

Step S109: A procedure ends.

FIG. 6A, FIG. 6B, FIG. 6C and FIG. 6D use magnetic field strength as an example to show a process in which the charging device 30 charges the first wearable device 10 according to the first electric power distribution solution in step S107, and the first wearable device 10 controls receiving of electric power in step S108.

FIG. 6A, FIG. 6B, FIG. 6C and FIG. 6D show that the charging device 30 gradually increases a quantity of turns of an output coil according to a change of the first electric power distribution solution, until a maximum charging capability is reached.

In addition, FIG. 6A, FIG. 6B, FIG. 6C and FIG. 6D also show a process in which according to the change of the first electric power distribution solution, the first wearable device 10 adjusts a receiving solution, gradually increases a quantity of turns of a coil, and controls receiving of magnetic field strength in order to receive electric power stably. FIG. 6A, FIG. 6B, FIG. 6C and FIG. 6D show only a process in which the charging device 30 and the first wearable device 10 gradually increase the quantities of turns of the coils and control the receiving of the magnetic field strength at the same time. In practice, the quantities of turns of the coils of the charging device 30 and the first wearable device 10 may be independently adjusted to achieve an objective of controlling the receiving of the magnetic field strength.

In a possible implementation manner, step S101 may further include receiving, by the first wearable device 10, a charging precedence coefficient K selected by a user, where 0<K<10, and the charging precedence coefficient K may represent an urgency degree of a charging requirement, and a larger value of K represents a more urgent charging requirement. For example, the user may use a first wearable device 10 to perform a service with high electric power consumption, and the user selects K=10, which indicates that the charging requirement is the most urgent.

The first wearable device 10 uses the charging precedence coefficient K as one piece of the electric power usage data, and in step S102, the charging precedence coefficient K is sent together with other electric power usage data to the charging device 30.

In step S103, the charging device may determine, according to the charging precedence coefficient K, to preferentially charge the wearable device with a most urgent charging requirement. For example, a larger value of K represents a more urgent charging requirement. When a set maximum value of K is 10, the first wearable device 10 with K=10 is preferentially charged.

The charging device 30 may also use the charging precedence coefficient K to calculate the electric power requirement parameter.

A formula of calculating an expected electric power support time T of a wearable device in use may be $$T1=1/K \times (PW/v) \quad (3),$$

A formula of calculating an expected electric power support time T of a wearable device in a standby state may be $$T2=1/K \times (m \times t) \quad (4),$$

Full electric power standby time of a device may be full electric power usage time recorded in a device specification.

This embodiment uses the wearable device in use as an example, that is, the first wearable device 10 is one or more wearable devices in use, and the foregoing formula (3) is applicable to an expected electric power support time T1 of the first wearable device 10.

Proceed with steps S104 to S109.

For example, in a possible implementation manner, in step S104, if T0=2 and T1=5, T1>T0, step S109 is performed and a procedure ends. However, if the charging precedence coefficient K selected by a user is received in step S101, and K=10, T1=0.5, T1<T0, and step S105 of determining the first electric power distribution solution and charging the first wearable device 10 is performed.

In this embodiment, in a manner of receiving the charging precedence coefficient K selected by the user, it is implemented that the user determines, according to an actual usage requirement and with reference to an existing electric power level of the wearable device, whether to charge the wearable device in order to further coordinate a relationship between an actual electric power requirement of the user and charging electric power distribution.

The wearable device in this embodiment of the present disclosure may be an MP3, a watch, an earphone, a pair of GOOGLE GLASS, or the like.

The charging device may be a backup battery, a storage battery, a wireless charging transmitting module, a wireless communication (HBC, WIFI, BLUETOOTH, or the like) module, or a control processing module, or may be a smartphone that has a wireless communication (HBC, WIFI, BLUETOOTH, or the like) interface and that can perform wireless charging on another device.

The former is not limited by a size of a screen, and can be designed into a relatively small size and shape with various fashion styles, and a battery capacity can also be designed very high. The latter, together with a smartphone, forms a natural combination for networking, where the smartphone not only exerts its original functions, but also can be used as an energy power center of the wearable device, and the smartphone evolves to a calculation capability center, a storage center, a communications center, an energy power center, and a media center of the wearable device.

According to the wireless charging method provided in this embodiment of the present disclosure, an electric power requirement parameter is calculated using electric power usage data, and a first electric power distribution solution is further determined for a wearable device in use according to the electric power requirement parameter, or a second electric power distribution solution is further determined for a wearable device in a standby state when there is no wearable device in use. According to the wireless charging method, a relationship between an actual electric power requirement of a user and charging electric power distribution can be coordinated, thereby implementing overall arrangement of electric power among multiple wearable devices in use and dynamic distribution of charging capabilities.

According to the wireless charging method in this embodiment of the present disclosure, a dynamic process related to an actual running service status of a wearable device is described, where summarization of electric power usage data and distribution of an electric power distribution solution are performed in real time, and a change of an electric power status of any wearable device causes a change of the electric power usage data, which may further change the electric power distribution solution, thereby facilitating overall arrangement of electric power of a charging device.

Embodiment 4

Figure 7:
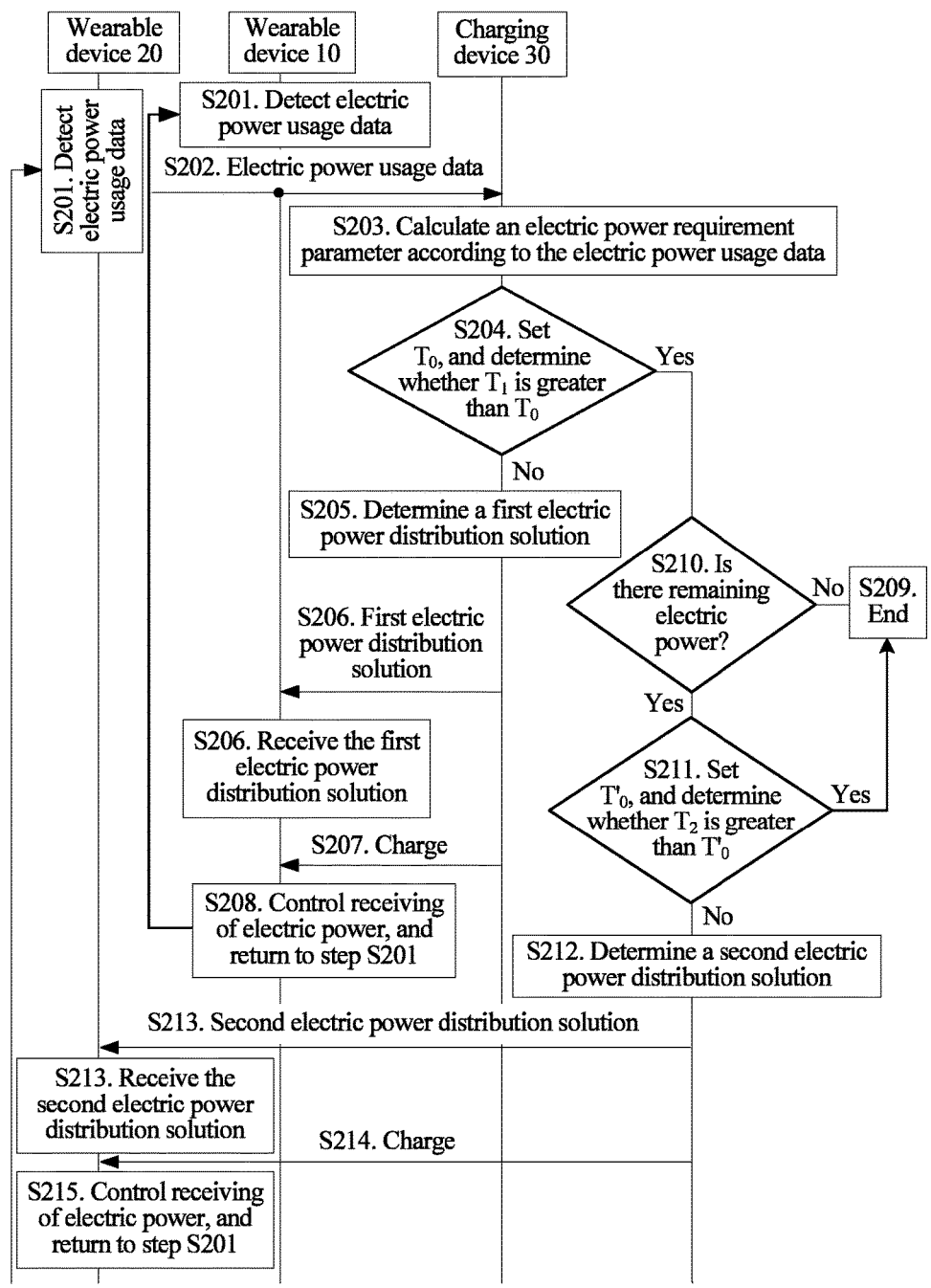
FIG. 7 shows a flowchart of a wireless charging method according to Embodiment 4 of the present disclosure.

FIG. 7 shows a flowchart of a wireless charging method according to Embodiment 4 of the present disclosure. A wearable device in this embodiment includes a first wearable device 10 and a second wearable device 20, where the first wearable device 10 is a wearable device in use, and the second wearable device 20 is a wearable device in a standby state. Quantities of the first wearable device 10 and the second wearable device 20 are not limited, which may be one or more.

Steps S201-S202: Same as steps S101-S102 in Embodiment 3. It should be noted that the second wearable device 20, like the first wearable device 10, performs step S201 to detect its own electric power usage data, and sends the electric power usage data to the charging device 30 in step S202.

Step S203: The charging device 30 calculates an electric power requirement parameter according to the electric power usage data.

The charging device 30 separately calculates, according to the electric power usage data, a first electric power requirement parameter of the first wearable device 10 in use and a second electric power requirement parameter of the second wearable device 20 in a standby state. An expected electric power support time T is still used as an example of the electric power requirement parameter.

An expected electric power support time T1 of the first wearable device 10 is calculated using a formula (1), and an expected electric power support time T2 of the second wearable device 20 is calculated using a formula (2).

Steps S204-S208: Same as steps S104-S108 in Embodiment 2. Further, when a result of determining is "yes" in step S204, no first electric power distribution solution is formed, and the following steps continue to be performed.

Step S210: The charging device 30 determines whether the charging device 30 has remaining electric power.

After charging the first wearable device 10 in use to implement that reserved electric power of the first wearable device 10 is greater than a first threshold T0, the charging device 30 determines whether it has remaining electric power.

When there is remaining electric power, step S211 is performed.

When there is no remaining electric power, step S209 is performed.

Step S211: The charging device 30 determines which step to be performed according to a preset second threshold.

The charging device 30 presets a second threshold T'0, where the second threshold T'0 may be less than the first threshold T0 in Embodiment 3, and determines whether the expected electric power support time T2 of the second wearable device 20 is greater than the second threshold T'0.

If T2>T'0, step S209 is performed.

If T2<=T'0, step S212 is performed.

Step S212: The charging device 30 determines a second electric power distribution solution.

According to the expected electric power support time T2 of the second wearable device 20 calculated in step S203, the charging device 30 uses a water-filling algorithm to determine a second electric power distribution solution for the second wearable device 20 in the standby state.

Step S213: The charging device 30 sends the second electric power distribution solution to the second wearable device 20.

The charging device 30 sends the second electric power distribution solution determined in step S212 to the second wearable device 20. The sending manner may be HBC, WIFI, or BLUETOOTH. The second wearable device 20 receives the second electric power distribution solution.

Step S214: The charging device 30 charges the second wearable device 20.

After the second wearable device 20 receives the second electric power distribution solution, the charging device 30 performs the second electric power distribution solution to charge the second wearable device 20. Like Embodiment 3, in another possible implementation manner, the charging device 30 may control another wireless charging device 40 to complete a charging process in this step.

Step S215: The second wearable device 20 controls receiving of electric power.

According to the second electric power distribution solution, the second wearable device 20 controls a charging receiving process of the second wearable device 20, controls output load and a quantity of turns of a wireless charging coil in order to receive the electric power, and controls output of the received electric power to a power consuming service and a battery, and/or an output time.

Returning to step S201, the second wearable device 20 acquires the electric power usage data in real time, and feeds back the electric power usage data to the charging device 30 such that the charging device 30 determines a new second electric power distribution solution in real time according to a water-filling algorithm in order to adapt to actual service power consumption of the wearable device.

Step S209: A procedure ends.

Electric power of the second wearable device 20 in the standby state is relatively sufficient, and the charging device 30 does not distribute electric power to the second wearable device 20. The procedure ends.

According to the wireless charging method provided in this embodiment of the present disclosure, a charging capability of a charging device is preferentially distributed to a first wearable device 10 that is being used and that has relatively high electric power consumption in order to supplement electric power consumption of the first wearable device 10 in a timely manner to support its normal use. A remaining charging capability is provided to a second wearable device 20 that is temporarily in a standby state to supplement electric power reserve of the second wearable device 20 for usage at any time.

According to the wireless charging method provided in this embodiment of the present disclosure, wireless charging electric power between wearable devices can be balanced in order to ensure that electric power supplementation of each wearable device matches electric power reserve and electric power consumption of the wearable device, and establish a linkage mechanism between wireless charging and a dynamic service feature of each wearable device.

Like Embodiment 4, in a possible implementation manner, the second wearable device 20 may receive, like the first wearable device 10 does, a charging precedence coefficient K2 selected by a user. Further, the charging device 30 may determine, only according to the charging precedence coefficient K2, to preferentially charge a second wearable device 20, or may calculate the electric power requirement parameter according to the charging precedence coefficient K2, that is, T2=1/K2×(PW/v). Steps S210-S209 continue to be performed.

Same as Embodiment 4, for example, in step S211, if T0=2 and T2=5, T2>T'0, step S209 is performed, and the first wearable device 10 is not charged. However, if a charging precedence coefficient K2 selected by a user is received in step S201, and K2=10, T2=0.5, T2<T'0, and step S212 is performed to determine the second electric power distribution solution and charge the second wearable device 20.

In this embodiment, in a manner of separately receiving charging precedence coefficients K2 of a first wearable device 10 and a second wearable device 20, it is implemented that a user determines, according to an actual usage requirement and with reference to an existing electric power level of a wearable device and a current electric power consumption situation, whether to charge the wearable devices in order to further coordinate a relationship between an actual electric power requirement of the user and charging electric power distribution, thereby implementing overall arrangement of electric power among multiple wearable devices and dynamic distribution of charging capabilities.

Embodiment 5

Figure 8:
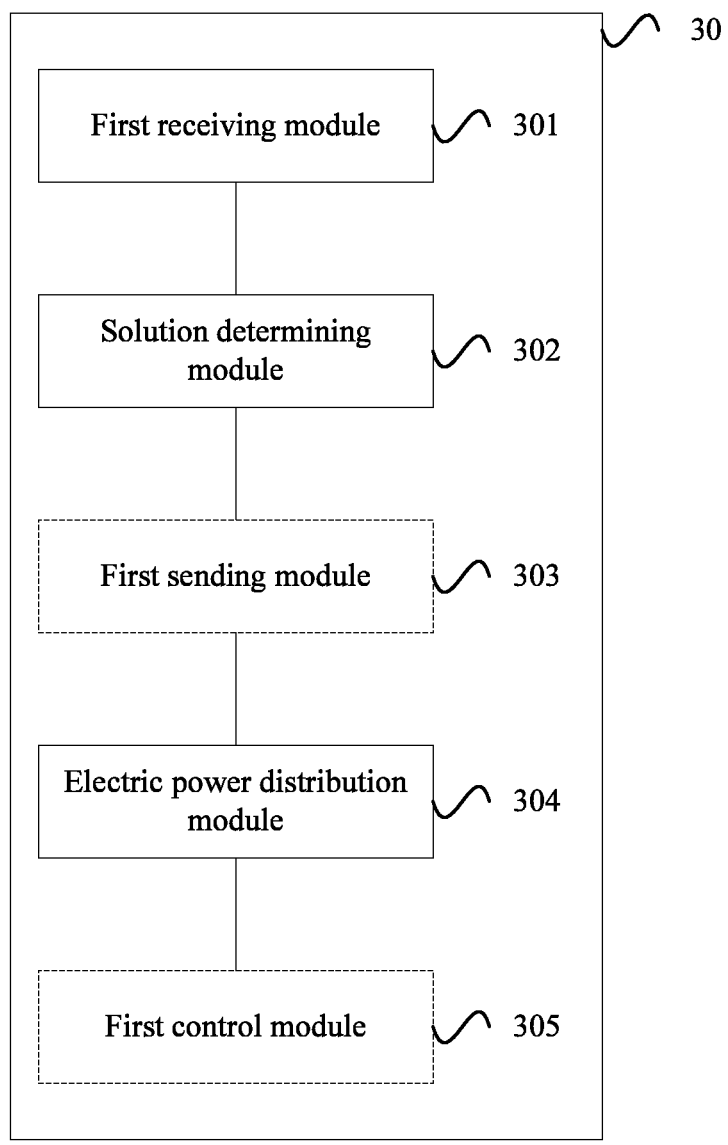
FIG. 8 shows a schematic structural diagram of a charging device according to Embodiment 5 of the present disclosure.

FIG. 8 is a schematic structural diagram of a wireless charging device according to Embodiment 5 of the present disclosure. The wireless charging device 30 includes a first receiving module 301, a solution determining module 302, and an electric power distribution module 304.

The first receiving module 301 is configured to receive electric power usage data sent by a wearable device. The receiving manner may be HBC, WIFI, or BLUETOOTH. The first receiving module 301 may be further configured to receive electric power usage data that is sent by the wearable device and that is acquired in real time.

The solution determining module 302 is connected to the first receiving module 301, and is configured to determine an electric power distribution solution according to the electric power usage data and using a water-filling algorithm. The electric power distribution solution is used for overall arrangement of electric power and dynamic distribution of charging capabilities.

The electric power distribution module 304 is connected to the solution determining module 302, and is configured to execute a first electric power distribution solution to charge a first wearable device 10.

Still referring to FIG. 8, in a possible implementation manner, the wireless charging device 30 further includes a first sending module 303, which is connected to the solution determining module 302 and the electric power distribution module 304, and is configured to send the electric power distribution solution to the first wearable device 10. The sending manner may be HBC, WIFI, or BLUETOOTH.

Figure 9:
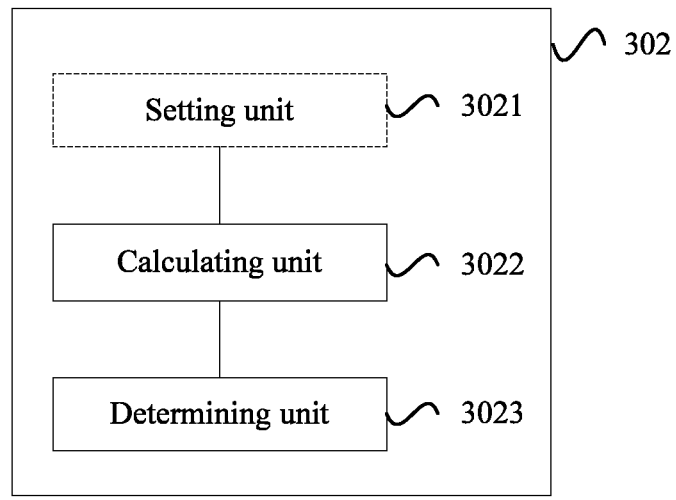
FIG. 9 shows a schematic structural diagram of a solution determining module in the charging device according to Embodiment 5 of the present disclosure.

As shown in FIG. 9, in an implementation manner, the solution determining module 302 may include a calculating unit 3022 and a determining unit 3023.

The calculating unit 3022 is configured to calculate an electric power requirement parameter according to the electric power usage data. Furthermore, the calculating unit 3022 is configured to calculate a first electric power requirement parameter according to first electric power usage data of the first wearable device 10 received by the first receiving module 301, and calculate a second electric power requirement parameter corresponding to a second wearable device 20 according to second electric power usage data of the second wearable device 20.

The determining unit 3023 is connected to the calculating unit 3022, and is configured to determine, according to the electric power requirement parameter, a charging order for charging the wearable device, and is configured to determine, according to the electric power usage data, charging electric power for charging the wearable device.

In an implementation manner, when the electric power usage data includes current electric power and an electric power consumption speed, the electric power requirement parameter includes an expected electric power support time.

The calculating unit 3022 is further configured to calculate the electric power requirement parameter according to the following formula. Expected electric power support time of a wearable device in use=current electric power/electric power consumption speed.

When the electric power usage data includes a proportion of remaining electric power and full electric power standby time, the electric power requirement parameter includes the expected electric power support time.

The calculating unit 3022 is configured to calculate the electric power requirement parameter according to the following formula. Expected electric power support time of a wearable device in a standby state=proportion of remaining electric power×full electric power standby time.

In an implementation manner, the electric power usage data received by the first receiving module 301 further includes a charging precedence coefficient K, and the solution determining module 302 is further configured to determine the electric power distribution solution based on the charging precedence coefficient K.

As shown in FIG. 9, in an implementation manner, the solution determining module 302 may further include a setting unit 3021.

The setting unit 3021 is connected to the calculating unit 3022, and is configured to preset a threshold.

If the wearable device includes at least one wearable device in use or at least one wearable device in a standby state, the determining unit 3023 is further configured to determine whether the electric power requirement parameter calculated by the calculating unit is not greater than the threshold, and if yes, determine the electric power distribution solution.

In an implementation manner, if the wearable device includes a wearable device in use and a wearable device in a standby state, the setting unit 3021 is further configured to preset a first threshold T0 for the wearable device in use, and preset a second threshold T0 for the wearable device in the standby state, where the second threshold T0 may be less than the first threshold T0.

The calculating unit 3022 is further configured to calculate a first electric power requirement parameter and a second electric power requirement parameter, and calculate, according to the electric power usage data of the first wearable device 10 and the second wearable device 20 received by the first receiving module 301, electric power requirement parameters corresponding to the first wearable device 10 and the second wearable device 20. A calculation formula is the same as the calculation formula described in the foregoing embodiment.

The determining unit 3023 is further configured to determine whether the first electric power requirement parameter is not greater than the first threshold T0, and if yes, determine the first electric power distribution solution; and determine whether the second electric power requirement parameter is not greater than the second threshold T'0, and if yes, determine the second electric power distribution solution.

In an implementation manner, the determining unit 3023 is further configured to extract current electric power of two wearable devices with minimum electric power requirement parameters, determine an adjustment value SP for electric power distribution based on a difference between the current electric power, and determine, according to the adjustment value SP, a step value SP10 for electric power distribution of the electric power distribution solution for charging a wearable device with a minimum electric power requirement parameter.

Referring to FIG. 8, in an implementation manner, the charging device 30 further includes a first control module 305, which is connected to the electric power distribution module 304, and is configured to control another wireless charging device 40 to charge the wearable device. In this way, even if electric power of the charging device 30 is insufficient, electric power can also be provided to the wearable device.

Embodiment 6

Figure 10:
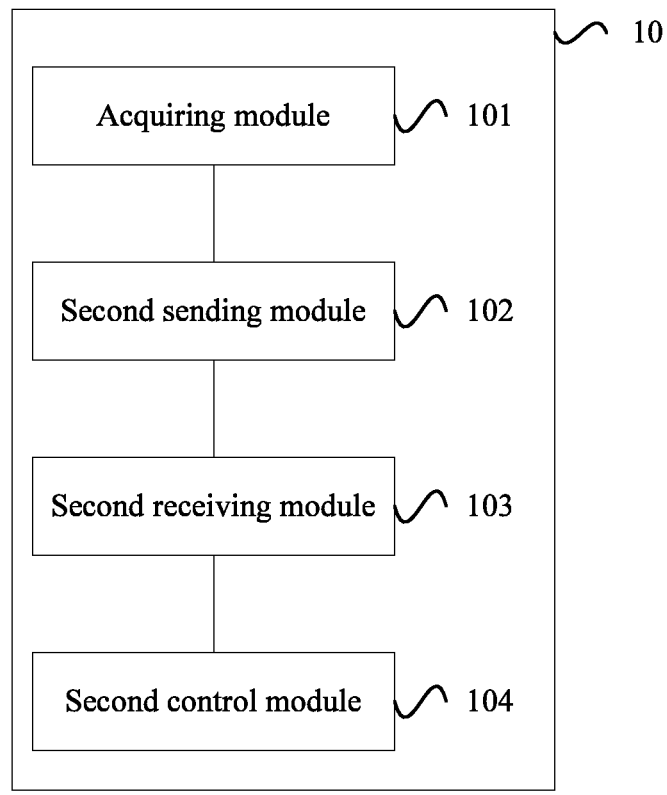
FIG. 10 shows a schematic structural diagram of a wearable device according to Embodiment 6 of the present disclosure.

FIG. 10 is a schematic structural diagram of a wearable device 10 according to an embodiment of the present disclosure. The wearable device 10 includes an acquiring module 101, a second sending module 102, a second receiving module 103, and a second control module 104.

The acquiring module 101 is configured to acquire electric power usage data in real time.

The second sending module 102 is connected to the acquiring module 101, and is configured to send the electric power usage data to a charging device. The sending manner may be HBC, WIFI, or BLUETOOTH.

The second receiving module 103 is connected to the second sending module 102, and is configured to receive an electric power distribution solution sent by the charging device, where the electric power distribution solution is determined by the charging device based on the electric power usage data, and is used to determine a charging order and charging electric power for charging the wearable device by the charging device. The receiving manner may be HBC, WIFI, or BLUETOOTH.

The second control module 104 is connected to the second receiving module 103, and is configured to control receiving of electric power according to the electric power distribution solution, and further, control output load and a quantity of turns of a wireless charging coil in order to receive electric power; and control output of the received electric power to a power-consuming service and a battery, or an output time in order to achieve an effect of properly distributing the electric power to the currently consuming service and the battery for reserve.

In an implementation manner, the acquiring module 101 is further configured to acquire a charging precedence coefficient selected by a user. A process in which the charging device determines the electric power distribution solution based on the charging precedence coefficient is the same as the process described in the foregoing embodiment.

It should be noted that in the foregoing embodiment, according to whether the wearable device is being used, the wearable device is distinguished as a first wearable device 10 in use and a second wearable device 20 in a standby state, where the first wearable device 10 and the second wearable device 20 both use a same structure as the wearable device 10 in Embodiment 6.

Embodiment 7

Figure 11:
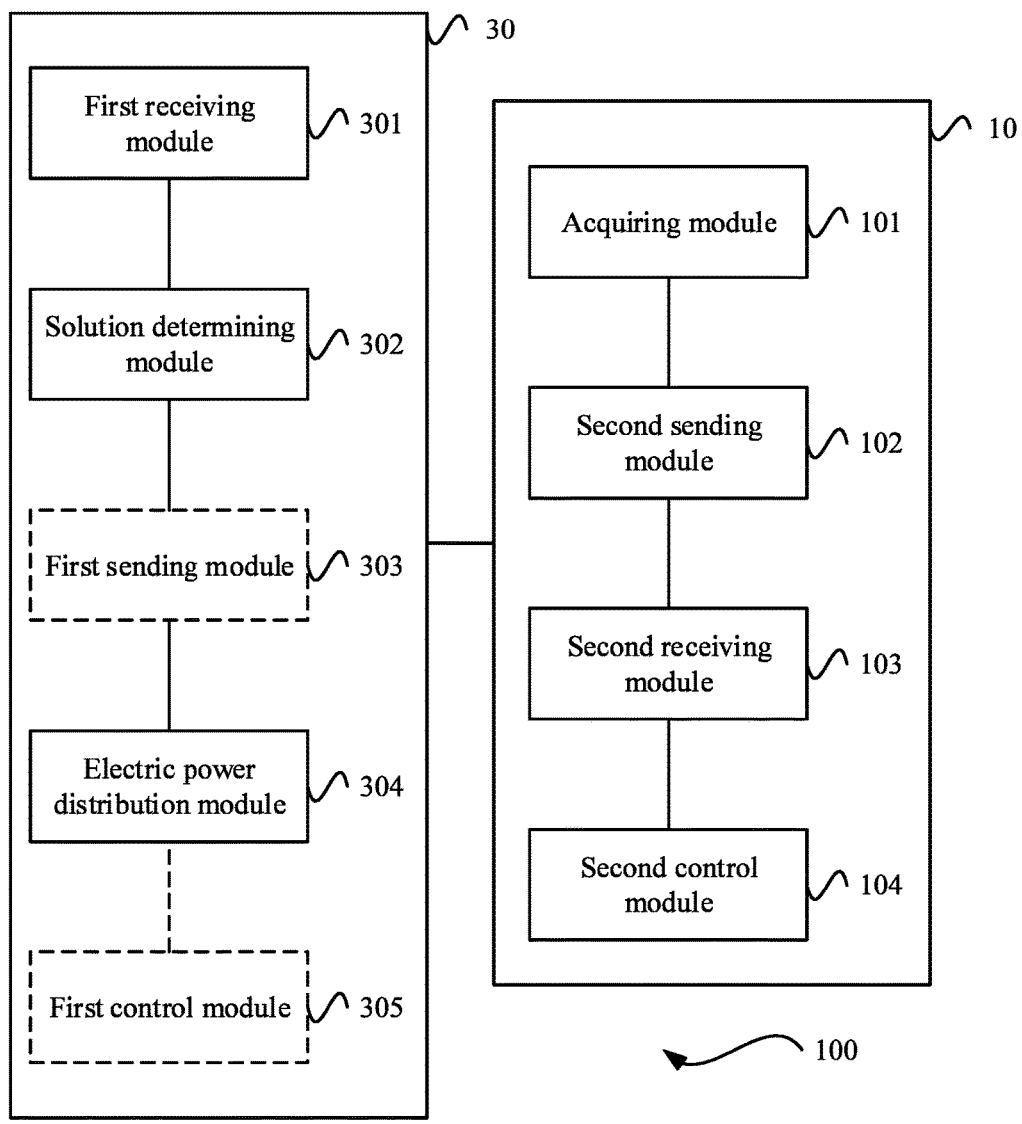
FIG. 11 shows a schematic structural diagram of a wireless charging system according to Embodiment 7 of the present disclosure.

FIG. 11 is a schematic structural diagram of a wireless charging system according to an embodiment of the present disclosure. The wireless charging system 100 includes at least one charging device 30 in Embodiment 5 and at least one wearable device 10 in Embodiment 6.

It should be noted that in the foregoing embodiment, according to whether the wearable device is being used, the wearable device is distinguished as a first wearable device 10 in use and a second wearable device 20 in a standby state, where the first wearable device 10 and the second wearable device 20 both use a same structure as the wearable device 10 in Embodiment 6.

Embodiment 8

Figure 12:
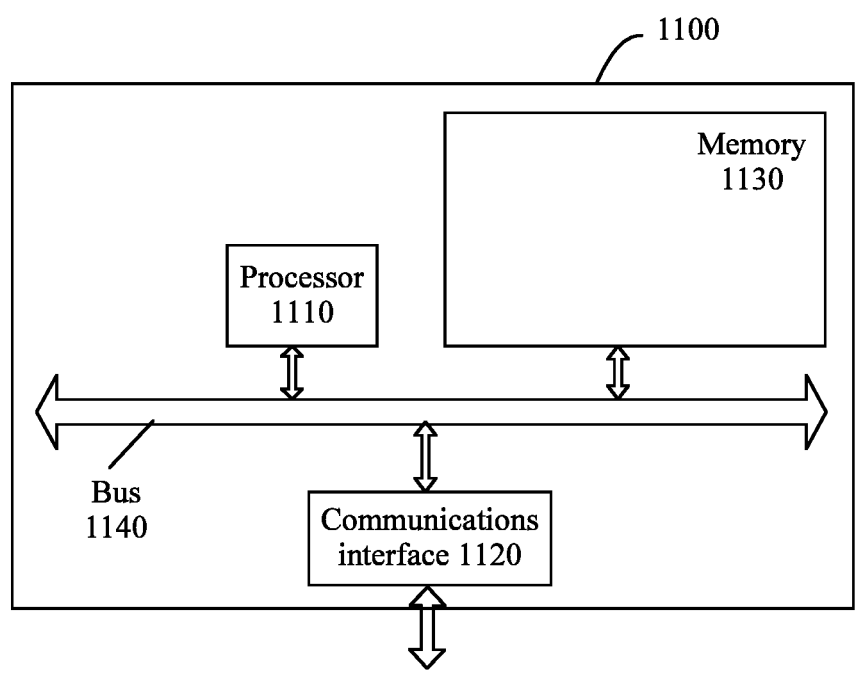
FIG. 12 shows a structural block diagram of a network device according to Embodiment 8 of the present disclosure.

FIG. 12 is a structural block diagram of a network device according to an embodiment of the present disclosure. The network device 1100 may be a host server that has a computing capability, a personal computer (PC), a portable computer or a terminal, or the like. This embodiment of the present disclosure sets no limitation on specific implementation of a computing node.

The network device 1100 includes a processor 1110, a communications interface 1120, a memory 1130, and a bus 1140. The processor 1110, the communications interface 1120, and the memory 1130 communicate with each other using the bus 1140.

The communications interface 1120 is configured to communicate with a network element, where the network element includes a virtual machine management center, a shared memory, and the like.

The processor 1110 is configured to execute a program. The processor 1110 may be a central processing unit (CPU), or an application specific integrated circuit (ASIC), or one or more integrated circuits configured to implement this embodiment of the present disclosure.

The memory 1130 is configured to store a file. The memory 1130 may include a high-speed random-access memory (RAM), and may further include a non-volatile memory, for example, at least one disk memory. The memory 1130 may also be a memory array. The memory 1130 may also be divided into blocks, and the blocks may be grouped into a virtual volume according to a specific rule.

In a possible implementation manner, the foregoing program may be program code that includes a computer operation instruction. The program may be further used to implement the following aspects.

According to a first aspect, a charging device receives electric power usage data sent by at least one wearable device.

The charging device determines an electric power distribution solution according to the electric power usage data, where the electric power distribution solution is used to determine a charging order and charging electric power for charging the wearable device by the charging device.

The charging device performs wireless charging on the wearable device according to the electric power distribution solution.

With reference to the first aspect, in a first possible implementation manner, the electric power distribution solution is further used to determine at least one of a charging speed, a charging time, and magnetic field strength.

With reference to the first aspect and the first possible implementation manner of the first aspect, in a second possible implementation manner, the electric power usage data includes current electric power and an electric power consumption speed.

With reference to the foregoing two possible implementation manners of the first aspect, in a third possible implementation manner, that the charging device determines an electric power distribution solution according to the electric power usage data further includes the following.

Obtaining, by the charging device, an electric power requirement parameter according to the electric power usage data.

Determining, by the charging device according to the electric power requirement parameter, the charging order for charging the wearable device.

Determining, by the charging device according to the electric power usage data, the charging electric power for charging the wearable device.

With reference to the foregoing three possible implementation manners of the first aspect, in a fourth possible implementation manner, the electric power requirement parameter includes an expected electric power support time.

Expected electric power support time=current electric power/electric power consumption speed.

With reference to the foregoing four possible implementation manners of the first aspect, in a fifth possible implementation manner, the electric power usage data further includes a charging precedence coefficient.

With reference to the foregoing five possible implementation manners of the first aspect, in a sixth possible implementation manner, the step of determining, by the charging device according to the electric power requirement parameter, the charging order for charging the wearable device further includes the following.

When the wearable device includes at least one wearable device in use or at least one wearable device in a standby state, and if the electric power requirement parameter of the wearable device is not greater than a preset threshold, determining the electric power distribution solution for the wearable device according to the electric power usage data of the wearable device.

With reference to the foregoing six possible implementation manners of the first aspect, in a seventh possible implementation manner, the step of determining, by the charging device according to the electric power requirement parameter, the charging order for charging the wearable device further includes the following.

When the wearable device includes a wearable device in use and a wearable device in a standby state, when a first electric power requirement parameter obtained according to electric power usage data of the wearable device in use is not greater than a first threshold, determining, by the charging device, a first electric power distribution solution, and when the first electric power requirement parameter is greater than the first threshold, and a second electric power requirement parameter obtained according to electric power usage data of the wearable device in the standby state is not greater than a second threshold, determining, by the charging device, a second electric power distribution solution.

With reference to the foregoing seven possible implementation manners of the first aspect, in an eighth possible implementation manner, the step in which the charging device determines an electric power distribution solution according to the electric power usage data further includes performing, by the charging device, the following steps based on a water-filling algorithm:

Extracting current electric power of two wearable devices with minimum electric power requirement parameters, and determining an adjustment value for electric power distribution based on a difference between the current electric power of the two wearable devices;

Determining, according to the adjustment value, a step value of electric power provided for the charging, and using the step value as the electric power distribution solution, to determine charging electric power for charging a wearable device with a minimum electric power requirement parameter.

With reference to the foregoing eight possible implementation manners of the first aspect, in a ninth possible implementation manner, after the charging device determines an electric power distribution solution according to the electric power usage data, the following step is further included: sending, by the charging device, the electric power distribution solution to the wearable device.

Where a manner of the sending, by the charging device, the electric power distribution solution to the wearable device includes HBC, WIFI, or BLUETOOTH.

With reference to the foregoing nine possible implementation manners of the first aspect, in a tenth possible implementation manner, that the charging device charges the wearable device further includes the following.

Controlling, by the charging device according to the electric power distribution solution, another wireless charging device to charge the wearable device.

According to a second aspect, a wearable device acquires electric power usage data.

The wearable device sends the electric power usage data to a charging device.

The wearable device receives an electric power distribution solution sent by the charging device, where the electric power distribution solution is determined by the charging device based on the electric power usage data, and is used to determine a charging order and charging electric power for charging the wearable device by the charging device.

The wearable device controls, according to the electric power distribution solution, receiving of electric power sent by the charging device.

With reference to the second aspect, in a first possible implementation manner, the electric power distribution solution further includes at least one of a charging speed, a charging time, and magnetic field strength.

With reference to the second aspect, in a second possible implementation manner, the electric power usage data includes current electric power and an electric power consumption speed.

With reference to the second aspect and the first or the second possible implementation manner of the second aspect, in a third possible implementation manner, the electric power usage data further includes a charging precedence coefficient.

With reference to the foregoing three possible implementation manners of the second aspect, in a fourth possible implementation manner, a manner in which the wearable device sends the electric power usage data to a charging device includes HBC, WIFI, or BLUETOOTH.

With reference to the foregoing four possible implementation manners of the second aspect, in a fifth possible implementation manner, the controlling, according to the electric power distribution solution, receiving of electric power sent by the charging device further includes the following.

Controlling, by the wearable device, output load and a quantity of turns of a wireless charging coil in order to receive electric power.

Controlling, by the wearable device, output of the received electric power to a service in use and a battery, or an output time.

According to the technical solution in this embodiment of the present disclosure, a relationship between an actual electric power requirement of a user and charging capability distribution can be coordinated, thereby implementing overall arrangement of electric power among multiple wearable devices and dynamic distribution of charging capabilities.

A charging capability of a charging device is preferentially distributed to a wearable device that is being used and that has relatively high electric power consumption in order to supplement electric power consumption of the wearable device in a timely manner to support its normal use. A remaining charging capability may be provided to a wearable device that is temporarily in a standby state to supplement electric power reserve of the wearable device for usage at any time.

According to the wireless charging method and system, the wireless charging device, and the wearable device in the embodiments of the present disclosure, a dynamic process related to an actual running service status of a wearable device is described, where summarization of electric power usage data and distribution of electric power distribution solutions are performed in real time, and a change of an electric power status of any wearable device may change an electric power distribution solution. According to the wireless charging method and system, the wireless charging device, and the wearable device in the embodiments of the present disclosure, wireless charging electric power between wearable devices can be balanced in order to ensure that electric power supplementation of each wearable device matches electric power reserve and electric power consumption of the wearable device, and establish a linkage mechanism between wireless charging and a dynamic service feature of each wearable device.

Sending and receiving of data and a solution are implemented in a HBC manner, and even in a case of no wireless network, wireless charging can also be implemented.

A person of ordinary skill in the art may be aware that, exemplary units and algorithm steps in the embodiments described in this specification may be implemented by electronic hardware or a combination of computer software and electronic hardware. Whether the functions are implemented by hardware or software depends on particular applications and design constraint conditions of the technical solutions. A person skilled in the art may select different methods to implement the described functions for a particular application, but it should not be considered that the implementation goes beyond the scope of the present disclosure.

If the functions are implemented in a form of computer software and sold or used as an independent product, to some degree, all or some of the technical solutions of the present disclosure (for example, some that contribute to the prior art) are reflected in a form of a computer software product. The computer software product is generally stored in a computer readable storage medium and includes several instructions for instructing a computer device (which may be a personal computer, a server, or a network device, or the like) to perform all or some of the steps of the methods described in the embodiments of the present disclosure. The foregoing storage medium includes any medium that can store program code, such as a universal serial bus (USB) flash drive, a removable hard disk, a read-only memory (ROM), a RAM, a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A wireless charging method, comprising:
    receiving, by a charging device, electric power usage data from at least two wearable devices;
    determining, by the charging device, an electric power distribution solution according to the electric power usage data, the electric power distribution solution being used to determine a charging order and charging electric power for charging one or more of the at least two wearable devices;
    performing, by the charging device, wireless charging on one or more of the at least two wearable devices according to the electric power distribution solution; and
    sending, by the charging device, the electric power distribution solution to at least one of the at least two wearable devices, the at least one of the at least two wearable devices controlling output load and a quantity of turns of a wireless charging coil to receive electric power, and the at least one of the at least two wearable devices controlling output of the received electric power and an output time to a service in use and a battery.

2. The wireless charging method of claim 1, wherein determining, by the charging device, the electric power distribution solution according to the electric power usage data comprises:
    obtaining, by the charging device, an electric power requirement parameter according to the electric power usage data;
    determining, by the charging device, the charging order according to the electric power requirement parameter; and
    determining, by the charging device, the charging electric power according to the electric power usage data.

3. The wireless charging method of claim 2, wherein determining, by the charging device, the charging order according to the electric power requirement parameter comprises determining the electric power distribution solution for a first wearable device according to the electric power usage data of the first wearable device when the first wearable device of the at least two wearable devices is in use or the first wearable device of the at least two wearable devices is in a standby state, and the electric power requirement parameter of the first wearable device is not greater than a preset threshold.

4. The wireless charging method of claim 2, wherein determining, by the charging device, the charging order according to the electric power requirement parameter comprises:
    determining, by the charging device, a first electric power distribution solution when a first electric power requirement parameter obtained according to electric power usage data of the at least one wearable device in use is not greater than a first threshold, and when the wearable devices comprise at least one wearable device in use and at least one wearable device in a standby state; and
    determining, by the charging device, a second electric power distribution solution, when the wearable devices comprise at least one wearable device in use and at least one wearable device in the standby state, and when the first electric power requirement parameter is greater than the first threshold, and the second electric power requirement parameter obtained according to electric power usage data of the at least one wearable device in the standby state is not greater than a second threshold.

5. The wireless charging method of claim 2, wherein determining, by the charging device, the electric power distribution solution according to the electric power usage data comprises performing, by the charging device, the following steps based on a water-filling algorithm:
    extracting current electric power of two wearable devices with minimum electric power requirement parameters;
    determining an adjustment value for electric power distribution based on a difference between the current electric power of the two wearable devices;
    determining, according to the adjustment value, a step value of electric power provided for a charging; and
    using the step value as the electric power distribution solution, to determine charging electric power for charging a wearable device with a minimum electric power requirement parameter.

6. The wireless charging method of claim 1, wherein a manner of sending, by the charging device, the electric power distribution solution to at least one of the at least two wearable devices comprises human body communication (HBC), wireless fidelity (WIFI), or BLUETOOTH.

7. A wireless charging device, comprising:
    a processor, and a non-transitory computer-readable storage medium coupled to the processor and storing programming instructions by the processor, the programming instructions instructing the processor to:
  receive electric power usage data from at least two wearable devices;
  determine an electric power distribution solution according to the electric power usage data, the electric power distribution solution being used to determine a charging order and charging electric power for charging one or more of the at least two wearable devices;
  charge the one or more of the at least two wearable devices according to the electric power distribution solution; and
  send the electric power distribution solution to at least one of the at least two wearable devices, the at least one of the at least two wearable devices controlling output load and a quantity of turns of a wireless charging coil to receive electric power, and the at least one of the at least two wearable devices controlling output of the received electric power and an output time to a service in use and a battery.

8. The wireless charging device of claim 7, wherein the programming instructions further instruct the processor to:
  obtain an electric power requirement parameter according to the electric power usage data;
  determine the charging order according to the electric power requirement parameter; and
  determine the charging electric power according to the electric power usage data.

9. The wireless charging device of claim 8, wherein the programming instructions further instruct the processor to:
  preset and store a threshold;
  determine whether the electric power requirement parameter is not greater than the threshold when a first wearable device of the at least two wearable devices is in use; and
  determine the electric power distribution solution for the first wearable device according to the electric power usage data of the first wearable device when the electric power requirement parameter is not greater than the threshold.

10. The wireless charging device of claim 8, wherein when the at least two wearable devices comprise at least one wearable device in use and at least one wearable device in a standby state, the programming instructions further instruct the processor to:
  preset and store a first threshold and a second threshold;
  calculate a first electric power requirement parameter based on electric power usage data of the at least one wearable device in use and a second electric power requirement parameter based on electric power usage data of the at least one wearable device in the standby state;
  determine whether the first electric power requirement parameter is not greater than the first threshold;
  determine a first electric power distribution solution when the first electric power requirement parameter is not greater than the first threshold;
  determine whether the second electric power requirement parameter is not greater than the second threshold; and
  determine a second electric power distribution solution when the second electric power requirement parameter is not greater than the second threshold.

11. The wireless charging device of claim 7, wherein the programming instructions further instruct the processor to:
  extract current electric power of two wearable devices with minimum electric power requirement parameters based on a water-filling algorithm;
  determine an adjustment value for electric power distribution based on a difference between the current electric power of the two wearable devices;
  determine, according to the adjustment value, a step value of electric power provided for a charging; and
  use the step value as the electric power distribution solution to determine charging electric power for charging a wearable device with a minimum electric power requirement parameter.

12. The wireless charging device of claim 7, wherein a manner of sending the electric power distribution solution to the wearable device comprises human body communication (HBC), wireless fidelity (WIFI), or BLUETOOTH.

13. The wireless charging device of claim 7, wherein the programming instructions further instruct the processor to control, according to the electric power distribution solution, another wireless charging device to charge the one or more of the at least two wearable devices.

14. A wearable device, comprising:
  a processor; and
  a non-transitory computer-readable storage medium coupled to the processor and storing programming instructions by the processor, the programming instructions instructing the processor to:
    acquire electric power usage data;
    send the electric power usage data to a charging device;
    receive an electric power distribution solution from the charging device, the electric power distribution solution being determined by the charging device based on the electric power usage data, and being used to determine a charging order and charging electric power for charging a wearable device by the charging device; and
    control, according to the electric power distribution solution, receiving of electric power from the charging device by:
      controlling output load and a quantity of turns of a wireless charging coil to receive electric power; and
      controlling output of the received electric power and an output time to a service in use and a battery.

15. The wearable device of claim 14, wherein the electric power usage data comprises current electric power and an electric power consumption speed.

16. The wearable device of claim 15, wherein the programming instructions further instruct the processor to acquire a charging precedence coefficient from a user.

17. The wearable device of claim 14, wherein a manner of sending the electric power usage data to the charging device comprises human body communication (HBC), wireless fidelity (WIFI), or BLUETOOTH.

* * * * *